US012467233B1

(12) United States Patent
Cardoso et al.

(10) Patent No.: US 12,467,233 B1
(45) Date of Patent: Nov. 11, 2025

(54) CONSTRUCTION MACHINE AND HYDRAULIC SYSTEM THEREOF

(71) Applicant: Robert Bosch GmbH, Stuttgart (DE)

(72) Inventors: Rafael Cardoso, Fountain Inn, SC (US); Shaoyang Qu, Fountain Inn, SC (US); Enrique Busquets, Fountain Inn, SC (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/769,110

(22) Filed: Jul. 10, 2024

(51) Int. Cl.

| | |
|---|---|
| ***E02F 9/22*** | (2006.01) |
| ***E02F 3/43*** | (2006.01) |
| ***F15B 11/16*** | (2006.01) |
| ***F15B 21/14*** | (2006.01) |

(52) U.S. Cl.

CPC .............. *E02F 9/2203* (2013.01); *E02F 3/43* (2013.01); *E02F 9/2221* (2013.01); *E02F 9/2225* (2013.01); *F15B 11/163* (2013.01); *F15B 21/14* (2013.01); *F15B 2211/20515* (2013.01); *F15B 2211/30525* (2013.01); *F15B 2211/30535* (2013.01)

(58) Field of Classification Search

CPC .................... F15B 11/163; F15B 21/14; F15B 2211/30535; E02F 9/2225

See application file for complete search history.

(56) References Cited

U.S. PATENT DOCUMENTS 5,579,642 A * 12/1996 Wilke .................. F15B 11/168 91/518
6,318,079 B1 * 11/2001 Barber .................. F15B 11/163 60/489

(Continued)

FOREIGN PATENT DOCUMENTS

WO WO-2021154369 A1 * 8/2021 .......... F15B 13/0417
WO 2022039697 A1 2/2022

(Continued)

OTHER PUBLICATIONS

U.S. Appl. No. 18/346,598, filed Jul. 3, 2023, by Cardoso et al. (Copy not submitted herewith pursuant to the waiver of 37 C.F. R. § 1.98(a)(2)(iii) issued by the Office on Oct. 19, 2004).

*Primary Examiner* — Thomas E Lazo
(74) *Attorney, Agent, or Firm* — Michael Best & Friedrich LLP

(57) ABSTRACT

A construction machine including a first and second implement functions operable by a first and second actuator and a hydraulic system for controlling the actuators in response to operator controls. The hydraulic system includes a pump, a pressure line connected with the pump and pressurized by the pump, a tank line in communication with a reservoir, a first circuit including a first directional flow control valve in command of the first actuator to control the first implement function, a second circuit in parallel with the first circuit, the second circuit including a second directional flow control valve in command of the second actuator to control the second implement function, and a load sense line. The first circuit is not pressure compensated between the load sense line and the first directional control valve and the load sense line is connected to the second directional flow control valve with a pressure compensator.

20 Claims, 6 Drawing Sheets

(56) References Cited

U.S. PATENT DOCUMENTS

| | | | | |
|---|---|---|---|---|
| 7,818,966 | B2 * | 10/2010 | Pack | F15B 13/0417 60/422 |
| 8,430,016 | B2 * | 4/2013 | Russell | F15B 13/0832 91/445 |
| 10,590,962 | B2 | 3/2020 | Coolidge et al. | |
| 11,225,776 | B2 | 1/2022 | White et al. | |
| 11,454,002 | B2 | 9/2022 | Takahashi et al. | |
| 2007/0045032 | A1 | 3/2007 | Brockmann et al. | |
| 2008/0152513 | A1 * | 6/2008 | Esders | B66F 9/24 417/411 |
| 2022/0252088 | A1 | 8/2022 | Vacca et al. | |
| 2023/0296171 | A1 | 9/2023 | Wang et al. | |

FOREIGN PATENT DOCUMENTS

| | | | | | |
|---|---|---|---|---|---|
| WO | WO-2023105855 | A1 * | 6/2023 | | |
| WO | WO-2024058689 | A1 * | 3/2024 | | E02F 9/2217 |

* cited by examiner

CONSTRUCTION MACHINE AND HYDRAULIC SYSTEM THEREOF

BACKGROUND

The present disclosure relates to hydraulic systems for construction machines.

SUMMARY

The present disclosure provides, in one aspect, a construction machine including a first implement function operable by a first actuator, a second implement function operable by a second actuator, and a hydraulic system for controlling the first and second actuators in response to operator controls. The hydraulic system includes a four-quadrant open-circuit pump, a pressure line connected with the pump and pressurized by the pump, a tank line in communication with a fluid reservoir, a first circuit including a first directional flow control valve in command of the first actuator to control the first implement function, a second circuit in parallel with the first circuit, the second circuit including a second directional flow control valve in command of the second actuator to control the second implement function, and a load sense line. The first circuit is not pressure compensated between the load sense line and the first directional control valve. The load sense line is connected to the second directional flow control valve with a pressure compensator.

The present disclosure provides, in another aspect, a construction machine including a first implement function operable by a first actuator, a second implement function operable by a second actuator, and a hydraulic system for controlling the first and second actuators in response to operator controls. The hydraulic system includes a four-quadrant open-circuit pump, a solenoid configured to control a swivel plate of the pump, and a controller configured to provide displacement control of the pump by direct current command to the solenoid. The first and second actuators are both configured for actuation by the pump in parallel first and second circuits. Load sensing for the first actuator is provided exclusively by the controller's displacement control of the pump and load sensing for the second actuator is provided by a pressure compensator to adjustably throttle flow in relation to a sensed load pressure.

The present disclosure further relates to a method of controlling a construction machine. The method includes driving a variable displacement pump with a prime mover to charge a pressure line of a hydraulic system having a first control valve with an extend position configured to selectively connect a first actuator for a first implement function to the pressure line and a second control valve with an extend position configured to selectively connect a second actuator for a second implement function to the pressure line. The method includes setting the second control valve into the extend position and providing load sensing with a pressure compensator to throttle flow through the second control valve while extending the second actuator. The method includes setting the first control valve into the extend position, and providing load sensing solely by control of the variable displacement pump without any pressure-compensating throttling of flow through the first control valve, while extending the first actuator. The method includes maintaining the first control valve in the extend position in which energy is recovered by the prime mover through the pump while retracting the first actuator.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

DETAILED DESCRIPTION

The present disclosure relates to a hydraulic system for use in a construction machine. The construction machine can have multiple implements for multiple functions and/or a multi-function implement(s) for which multiple work cylinders are provided. In the context of the present disclosure, each separate function is controllable separately by one operator control or more operator controls (e.g., levers, a joystick, etc.). Although each separate function may be controllable separately by one operator control or more operator controls, these may collectively be referred to herein as "operator inputs" or "operator controls." The hydraulic system has a corresponding plurality of channels or circuits. Each channel or circuit includes a master spool valve responsive to the operator control and configured to selectively control the flow of fluid to/from the work cylinder to accomplish an implement function. Although a given implement function may be enabled by multiple work cylinders in parallel to share the load, these may collectively be referred to herein as "the actuator" or "the cylinder." All the various actuators are supplied with hydraulic fluid from one shared pump. The pump is variable for positive and negative displacement (i.e., reversible flow direction from a flow-producing "Pumping" mode to a flow-receiving "Motoring" mode) and is referred to as having over-center capability as it can switch between positive and negative during operation. The pump may also be referred to as an over-center variable displacement pump. In some constructions, the pump can be a Bosch Rexroth A10VO with eOC control (also called EC4), although other pumps may also be suitable for use. As will become apparent from the following description, the hydraulic system is configured for selective energy recovery from at least one of the actuators, but less than all of the actuators. As such, at least one of the circuits is constructed and operates differently than the others.

Figure 1:
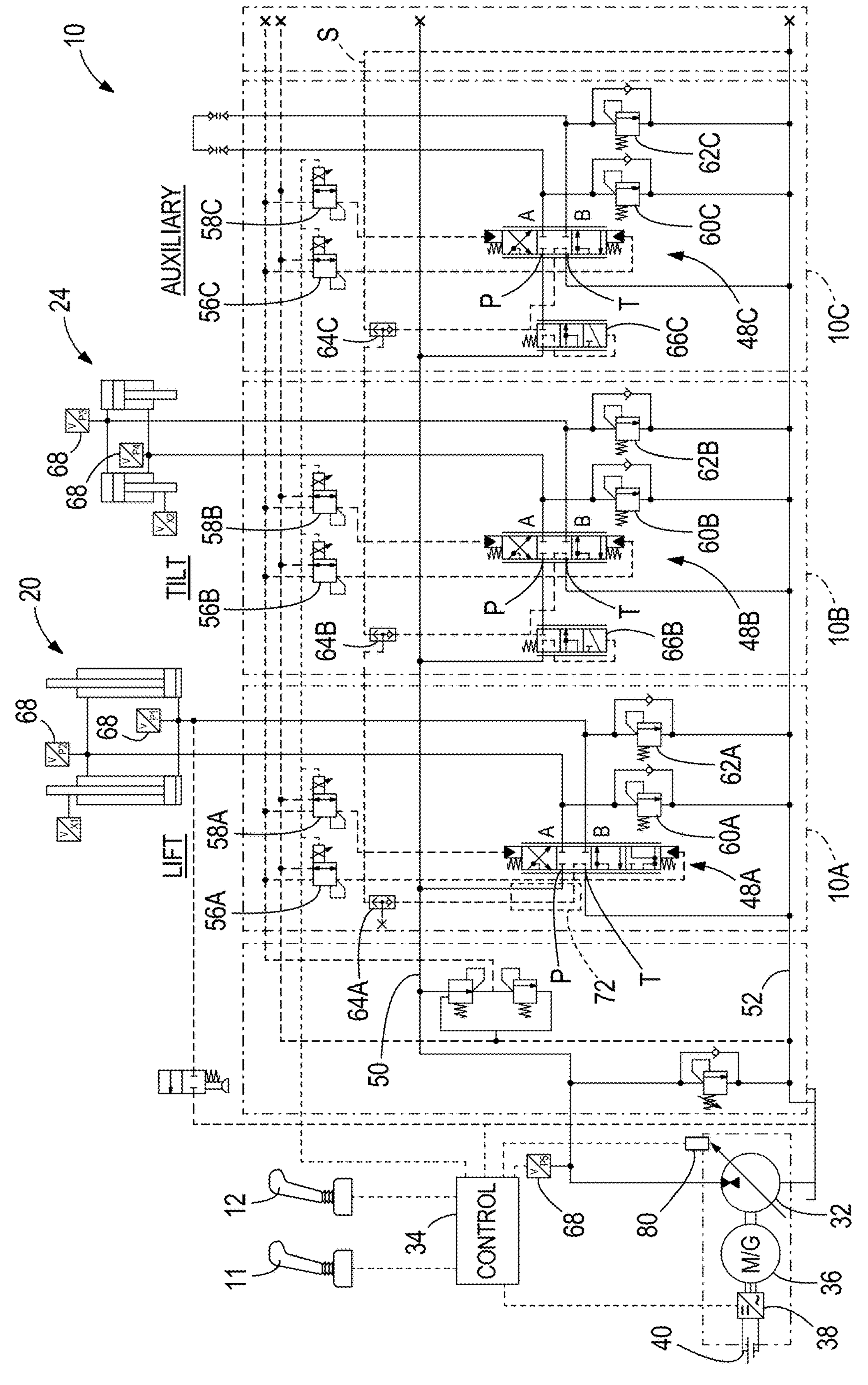
FIG. 1 illustrates a schematic representation of a hydraulic system.
Figure 6:
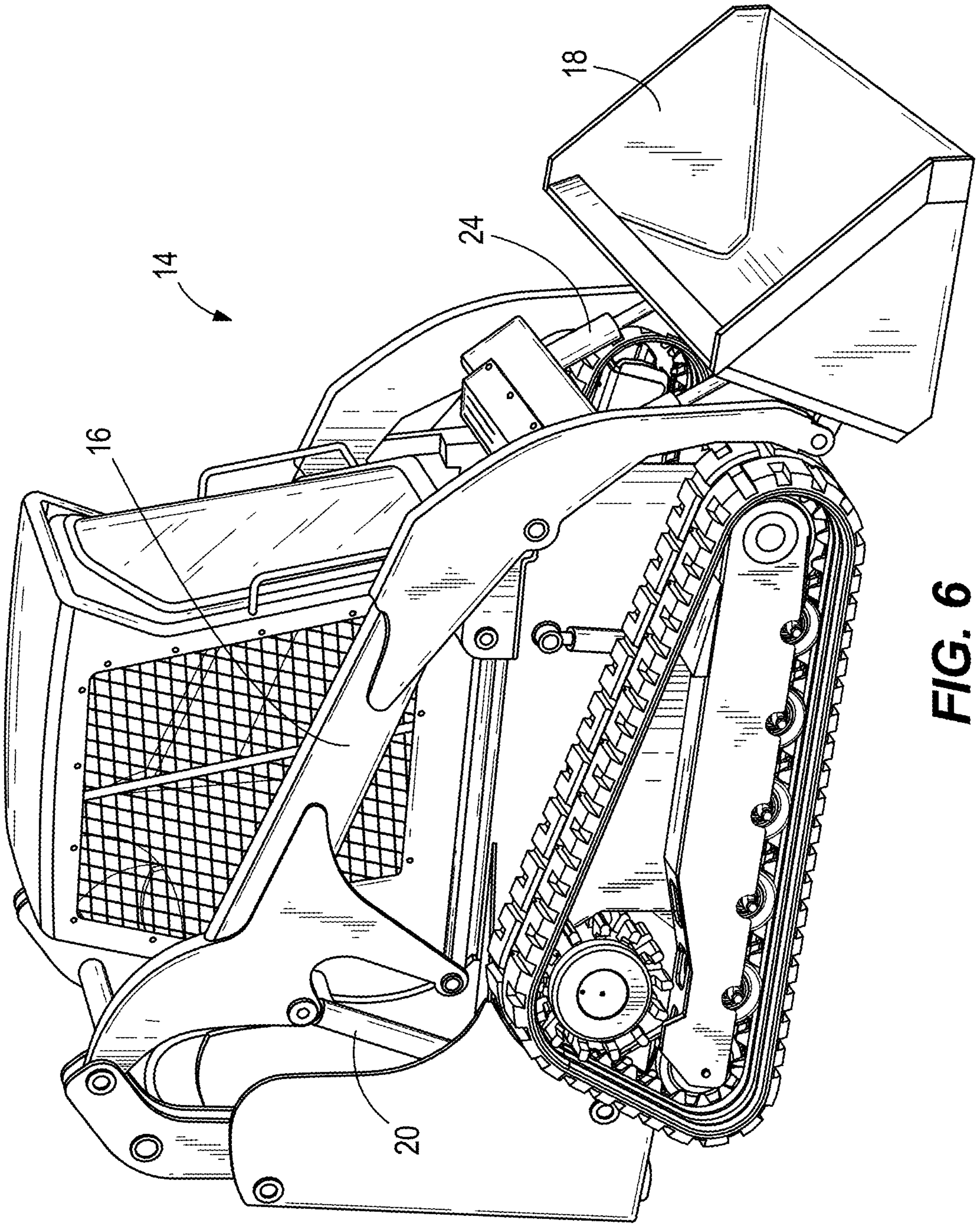
FIG. 6 illustrates an exemplary construction machine.

In accordance with the introduction above, FIG. 1 illustrates a hydraulic system 10 for controlling the implement functions in response to operator inputs or controls (e.g., a first joystick 11 and an optional second joystick 12). The hydraulic system 10 may be implemented in a construction machine, an example of which is shown in FIG. 6. Specifically, FIG. 6 shows a skid steer loader 14. Those of skill in the art will appreciate that the invention may also be applied to any number of additional types of construction machines, known in the art or later-developed, including but not limited to backhoes, excavators, and dump trucks. As shown in FIG. 6, the loader 14 includes a boom 16. The boom 16 depends from a mainframe of the machine and has an implement or end effector (e.g., bucket 18) at its distal end. A boom actuator 20 (e.g., one or more double-acting hydraulic work cylinders) controls the movement of the boom 16. In particular, the boom actuator 20 is controlled to provide a +/− lift function (i.e., extending and retracting the boom 16). The boom actuator 20 is a primary actuator, as it supports the entire load of the boom 16, including the bucket 18 and its contents. A secondary actuator 24 (e.g., one or more double-acting hydraulic work cylinders) is configured to manipulate the bucket 18 relative to the boom 16. As such, the secondary actuator 24 is carried by the boom 16 and is not responsible for supporting the load of the boom 16, but rather only the bucket 18 and its contents. The secondary actuator 24 is controlled to provide a +/− tilt function (i.e., dump and curl of the bucket 18). The boom actuator 20 and the secondary actuator 24 are shown in the FIG. 1 schematic of the hydraulic system 10. The boom actuator 20 represents the function and the fluid consumer of the first circuit 10A of the hydraulic system 10, and the secondary actuator 24 represents the function and the fluid consumer of a second circuit 10B of the hydraulic system 10. The second circuit 10B is in parallel with the first circuit 10A. The hydraulic system 10 can include any practical number of additional circuits-one of which is illustrated in FIG. 1 as the auxiliary circuit 10C.

With continued reference to FIG. 1, all of the circuits 10A-10C of the hydraulic system 10 are connected with and selectively driven by a pump 32. As noted previously, the pump 32 is a four-quadrant open-circuit pump that, under the control of an electronic controller 34, can operate as a pump in forward and reverse directions, and also as a motor in forward and reverse directions. The pump 32 is coupled to a prime mover 36 in which torque is transferred therebetween. In some constructions, the prime mover 36 is an electric machine operable as an electric motor to drive the pump 32 and alternately operable as an electric generator to be driven by the pump 32 (when operating as a motor). The controller 34 is a main controller configured to send respective control signals configured to control the pump 32 and the prime mover 36 in response to detecting signals from the first joystick 11 and the second joystick 12. In the illustrated construction, the first joystick 11 provides input for the +/− lift function and the second joystick 12 provides input for the +/− tilt function. In other constructions, the hydraulic system includes additional operator inputs (e.g., joysticks) for inputs for other implement functions (e.g., the auxiliary circuit 10C). In other constructions, the hydraulic system includes a single operator input (e.g., a single joystick) that provides input for multiple implements (e.g., the +/− lift function, the +/− tilt function). As illustrated, the main controller 34 can provide a control signal to a motor controller 38 (e.g., including an inverter) that controls current transfer between the prime mover 36 and an energy store 40. The energy store 40 is coupled to the prime mover 36. In some constructions, the energy store 40 can be a battery. The energy store 40 can provide output current at a predetermined voltage (e.g., 700 V) to drive the prime mover 36 and operate the pump 32. The energy store 40 can also receive a charging current from the prime mover 36 when operating as an electrical generator. It is also noted here that the prime mover 36 and energy store 40 can take other forms. For example, in some constructions, the prime mover 36 can be an internal combustion engine. The energy store 40 can be a flywheel, an accumulator, or another mechanical device coupled to the internal combustion engine.

Although specific functions of the controller 34 are provided later in the disclosure, following a description of the hydraulic elements of the hydraulic system 10, it is noted here that the controller 34 may include one or more electronic processors and one or more memory devices. The controller 34 may be communicably connected to one or more sensors or other inputs, such as described herein. The electronic processor may be implemented as a programmable microprocessor, an application specific integrated circuit (ASIC), one or more field programmable gate arrays (FPGA), a group of processing components, or with other suitable electronic processing components. The memory device (for example, a non-transitory, computer-readable medium) includes one or more devices (for example, RAM, ROM, flash memory, hard disk storage, etc.) for storing data and/or computer code for completing the or facilitating the various processes, methods, layers, and/or modules described herein. The memory device may include database components, object code components, script components, or other types of code and information for supporting the various activities and information structure described in the present application. According to one example, the memory device is communicably connected to the electronic processor and may include computer code for executing one or more processes described herein. The controller 34 may further include an input-output ("I/O") module. The I/O module may be configured to interface directly interface with one or more devices, such as a power supply, sensors, displays, etc. In one construction, the I/O module may utilize general purpose I/O (GPIO) ports, analog inputs/outputs, digital inputs/outputs, and the like. As detailed further below, the controller 34 can be programmed with an algorithm.

The first circuit 10A includes a first direction control valve (e.g., master spool valve) 48A in command of the boom actuator 20 to control the first implement function. The master spool valve 48A includes a pressure port P, a tank port T, a first work port A, and a second work port B. The pressure and tank ports P, T are respectively connected to pressure and tank lines 50, 52. As noted in FIG. 1, the pump 32 has an outlet connected to the pressure line 50 such that the hydraulic fluid in the pressure line 50 can be pressurized to a predetermined level. Likewise, an inlet side of the pump 32 can be connected to a reservoir (or "tank") 54 to draw hydraulic fluid therefrom. The tank line 52 is in communication with a fluid reservoir. In some constructions, the tank line 52 is at atmospheric pressure. The work ports A, B are connected to the two sides of the cylinder(s) that form the boom actuator 20. The master spool valve 48A has a plurality of valve positions and is pilot actuated via pilot control valves 56A, 58A. The master spool valve 48A is in command of the boom actuator 20 to control the +/− lift function of the boom actuator 20 via the first circuit 10A.

In an extend position, the master spool valve 48A connects the pressure port P to the second work port B while connecting the tank port T to the first work port A. In the extend position, the boom actuator 20 is coupled to the pressure line 50 for the +lift function of the first circuit 10A. In a retract position, the master spool valve 48A connects the pressure port P to the first work port A while connecting the tank port T to the second work port B. In the retract position, the secondary actuator 24 is coupled to the pressure line 50 for the −lift function of the first circuit 10A. The extend and retract positions lift and lower the boom actuator 20 (e.g., +/− lift of the boom actuator 20). In a hold position, the master spool valve 48A isolates the ports P, T, A, and B from one another such that no fluid is transferred between the ports. In other words, the master spool valve 48A is in a neutral position in which the boom actuator 20 maintains position. In a float position, the master spool valve 48A connects the ports A, B directly to the to tank port and the pressure port P is isolated from the other ports. The float position allows for the boom actuator 20 to lift and/or retract without supplying pressure to the master spool valve 48A from the pump 32. For instance, in the float position, the force of gravity acting on the bucket 18 may lower the boom actuator 20 without the pump 32 supplying pressure to the first circuit 10A. In the float position, the pump 32 is running in an idle mode, which is sufficient in supplying pressure to the pilot control valves 56A, 58A. Also, in the float position, the implement function may follow the ground, including uneven terrain, without use of the pump 32.

The first circuit 10A includes pressure relief valves 60A, 62A. In the instance that pressure between the first work port A and the boom actuator 20 exceeds a pressure threshold, the pressure relief valve 60A opens to enable fluid communication to the tank line 52. In the instance that pressure between the second work port B and the boom actuator 20 exceeds a pressure threshold, the pressure relief valve 62A opens to enable fluid communication to the tank line 52. The first circuit 10A includes a shuttle valve 64A.

The second circuit 10B for the boom actuator 20 includes like structure to the first circuit 10A, with like features annotated with similar numbers followed with a 'B'. Since the second circuit 10B is like the first circuit 10A, only differences will be discussed. In the illustrated construction, the master spool valve 48B does not include the float position. In other constructions, the master spool valve 48B includes the float position. In the extend position (e.g., a dump position), the master spool valve 48B connects the pressure port P to the second work port B while connecting the tank port T to the first work port A. In the extend position, the secondary actuator 24 is coupled to the pressure line 50 for the +tilt function of the second circuit 10B. In the retract position (e.g., a curl position), the master spool valve 48B connects the pressure port P to the first work port A while connecting the tank port T to the second work port B. In the retract position, the secondary actuator 24 is coupled to the pressure line 50 for the −tilt function of the second circuit 10B. The second circuit 10B includes a pressure compensator 66B that couples the master spool valve 48B to a load sense line S.

Pressure compensators are used for pressure compensation function (e.g., control of flow by compensating for the changes in load pressure) and load holding function (e.g., preventing unintentional movement of consumers).

For the load holding function, the pressure compensator 66B blocks flow between the pressure line 50 and the master spool valve 48B, thereby providing load holding for the secondary actuator 24.

For the pressure compensation function, the pressure compensator 66B provides a pressure differential between the pressure line 50 and the working port P. Specifically, the pressure differential is a result of the spring attached to the pressure compensator 66B. In other words, the pressure supplied to the working port P via the pressure line 50 is the sum of the load pressure and the pressure produced by the spring of the pressure compensator 66B. When the pressure supplied to the pressure line 50 is less than the sum of the load pressure and spring pressure of the pressure compensator 66B, the pressure compensator 66B blocks flow between the pressure line 50 and the master spool valve 48B such that the pump 32 can build pressure in the pressure line 50. Therefore, the pressure compensator 66B does not permit backflow because pressure compensators automatically block flow between the pressure line 50 and the master spool valve 48B (e.g., no flow going in or out of the pressure compensator) when the pressure of the pressure line 50 is less than the pressure of the load and the spring of the pressure compensator. Each of the second and auxiliary circuits 10B, 10C utilize conventional hydraulic load holding.

The auxiliary circuit 10C for the boom actuator 20 includes like structure to the first circuit 10A, with like features annotated with similar numbers followed with a 'C'. Since the auxiliary circuit 10C is like the first circuit 10A, only differences will be discussed. In the illustrated construction, the master spool valve 48C does not include the float position. In other constructions, the auxiliary circuit 10C includes the float position. The auxiliary circuit 10C includes a pressure compensator 66C that couples the master spool valve 48C to a load sense line S. In some constructions, the second and auxiliary circuits 10B, 10C are identical in layout.

Figure 2:
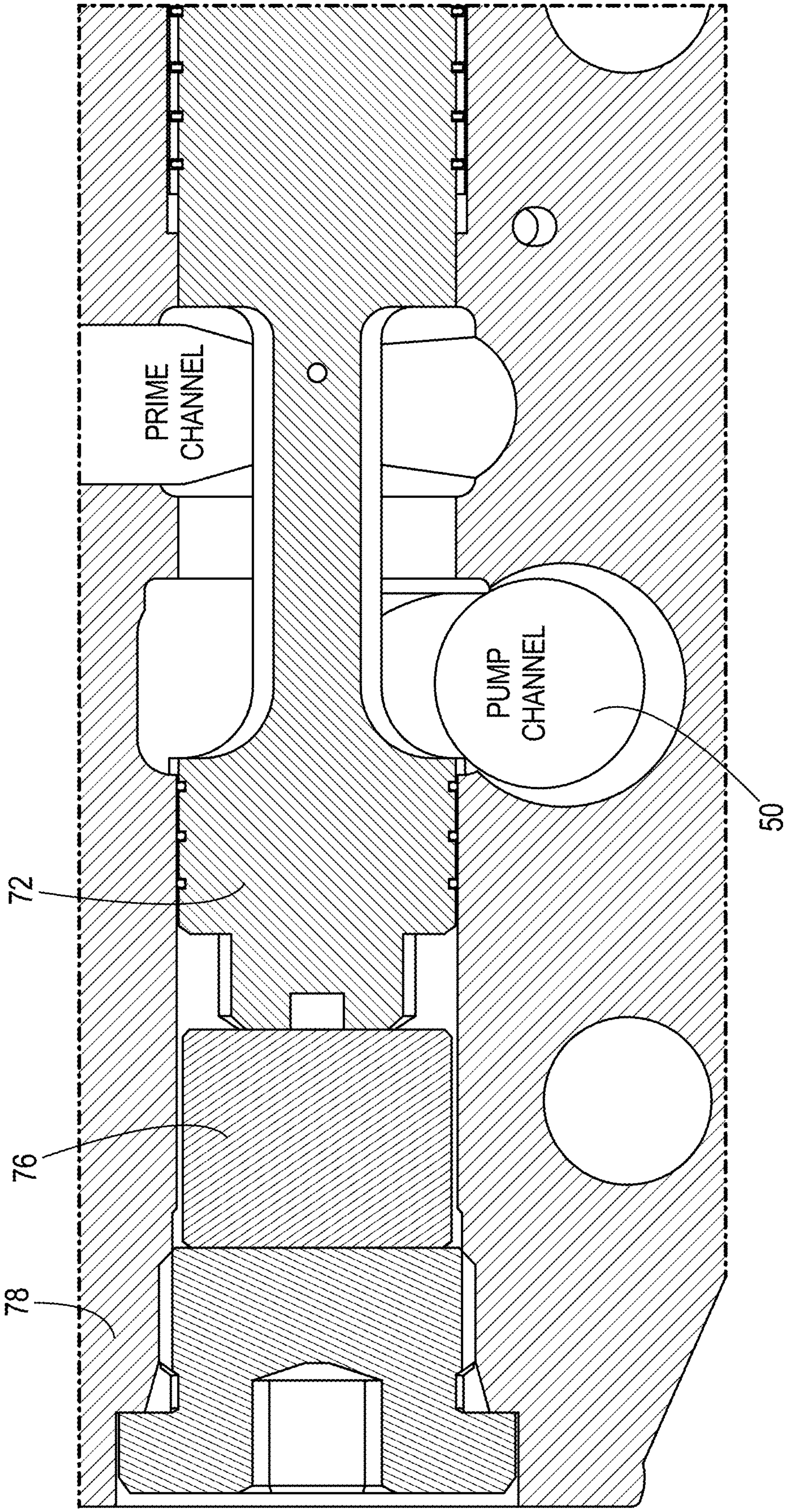
FIG. 2 illustrates a modified pressure compensator of a first circuit of the hydraulic system.
Figure 3:
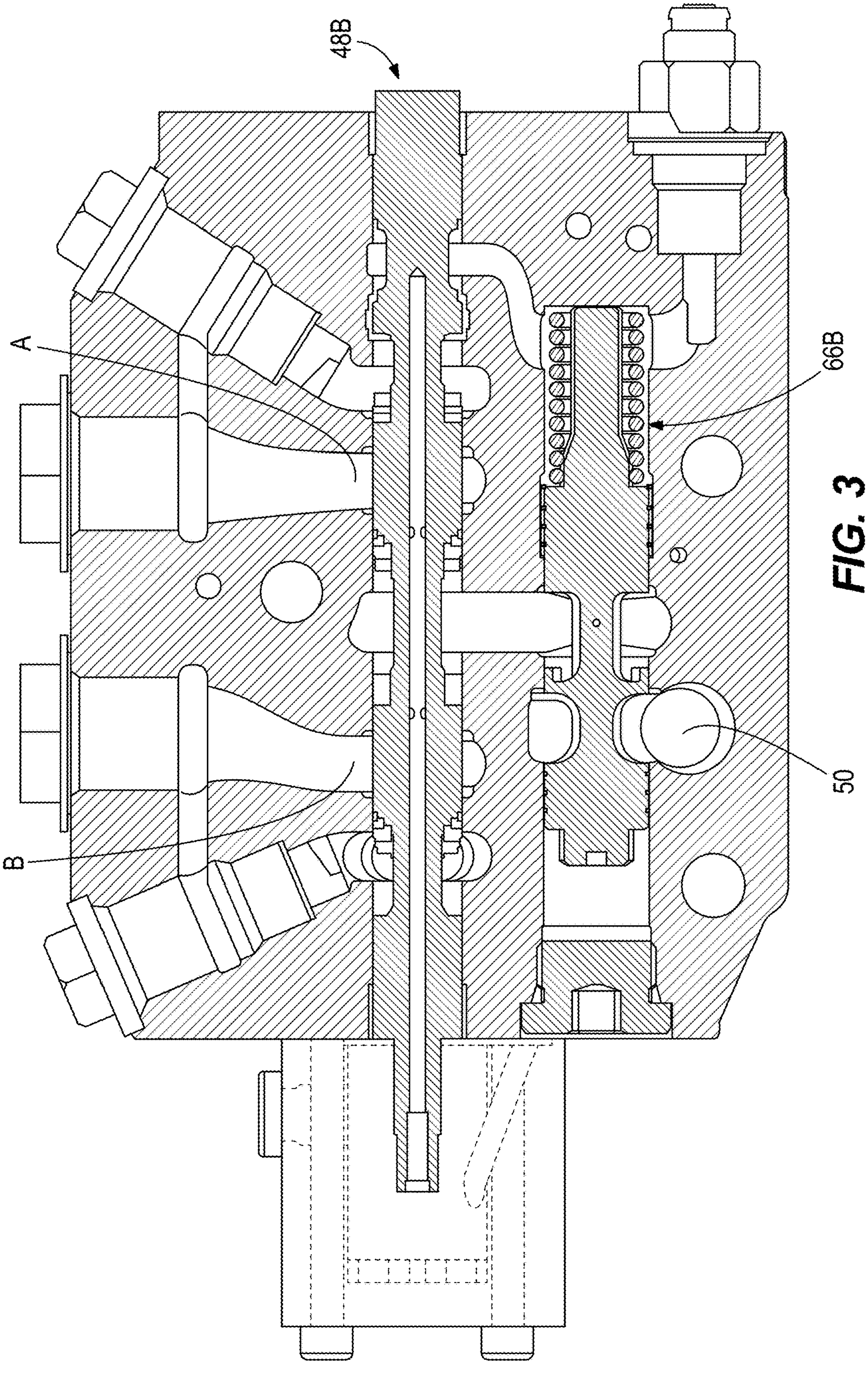
FIG. 3 illustrates a pressure compensator of a second circuit of the hydraulic system.

FIG. 2 illustrates the first circuit 10A including a modified pressure compensator 72 (i.e., structure of a pressure compensator, modified to be deactivated or non-functional). In particular, the modified compensator 72 of FIG. 2 includes a pressure compensator spool that is shimmed to maintain a fixed opening by a shim 76. The fixed opening held by the shim 76 can correspond to a wide-open or unthrottled position. In some constructions, the modified pressure compensator 72 is modified from a pressure compensator having a structure similar or identical to the pressure compensator 66B illustrated in FIG. 3. In the illustrated construction, the modified pressure compensator 72 shares a valve block 78 with the master spool valve 48A. Therefore, in some constructions, a conventional valve block configured to accommodate a traditional pressure compensator may be used, even though the first circuit 10 is not pressure compensated. In other constructions, the modified pressure compensator 72 may be entirely removed, and the valve block is modified accordingly. The first circuit 10A, whether it includes the modified (deactivated) pressure compensator 72 or no pressure compensator at all, is not pressure compensated between a load sense line S and the master spool valve 48A. In contrast, FIG. 3 illustrates the second circuit 10B being pressure compensated by the pressure compensator 66B between the load sense S and the master spool valve 48B.

The first circuit 10A is configured for energy recovery in an energy recovery mode because the first circuit 10A permits back flow of fluid to the pump 32. In contrast, the second circuit 10B and/or the auxiliary circuit 10C are not configured for energy recovery because the second and auxiliary circuits 10B, 10C do not permit back flow to the pump 32. Specifically, the pressure compensators 66B, 66C of the second and auxiliary circuits 10B, 10C, respectively, prevent the back flow. Therefore, the first circuit 10A is the only circuit of the hydraulic system 10 that permits the back flow to the pump 32 and is therefore the only circuit in the hydraulic system 10 for energy recovery. The back flow occurs in the first circuit 10A when the pressure of the working port B is higher than the pressure line 50. For instance, the pressure of the working port B may be higher than the pressure line 50 when the boom actuator 20 is raised relative to the ground.

In the energy recovery mode, the pump 32 receives back flow from the first circuit 10A when the master spool valve 48A is maintained in the extend position. In particular, the controller 34 can be programmed to selectively set the master spool valve 48A into the extend position in response to a control of the joystick 11 indicative of the operator's desire to retract the boom actuator 20 to lower the boom, when the controller 34 utilizes the energy recovery mode. As described above, the pump 32 is a variable pump capable of negative and positive displacement. When the pump 32 receives the back flow via the pressure line 50, the pump 32 is considered to be in the motoring mode. The pump 32 transfers mechanical energy to the prime mover 36, which then operates as an electric generator. In other words, the pump 32 drives rotation of the prime mover 36, in the energy recovery mode. In some constructions, the prime mover 36 generates an electrical charge from the torque received from the pump 32. The energy generated by the prime mover 36 in the energy recovery mode is sent to the energy store 40. In some constructions, the energy store 40 (e.g., battery) stores the electrical charge from the prime mover 36.

In other constructions, the back flow in the pressure line 50 can be directed toward the second circuit 10B and/or the auxiliary circuit 10C. Specifically, the pressure line 50 is pressurized by the back flow of the first circuit 10A and the implement functions of the second and auxiliary circuits 10B, 10C (e.g., the secondary actuator 24) are supplied with flow from the back flow from the first circuit 10A. In other words, a majority of the flow supplied for the implement functions of the second and auxiliary circuits 10B, 10C is provided by the back flow of the first circuit 10A.

The nominal control principle for a conventional load sensing system and load holding will not work with the hydraulic system 10 because the hydraulic system 10 includes a circuit (e.g., the first circuit 10A) that is not pressure compensated between the load sense line S and the master spool valve 48A.

The load holding function of the first circuit 10A relies on the controller 34 programmed with the algorithm for load holding. Specifically, the algorithm for load holding relies on pressure sensors 68. Specifically, a pressure sensor of the pressure sensors 68 detect pressures of the boom actuator 20. A pressure sensor of the pressure sensors 68 detect a pressure of the pump 32 (e.g., the pressure line 50). A pressure sensor of the pressure sensors 68 detect a pressure of the secondary actuator 24. The shuttle valve 64A does not contribute to the load holding function of the first circuit 10A. Additional details regarding load holding using the controller 34 is disclosed in U.S. patent application Ser. No. 18/346,598 filed Jul. 3, 2023, to Robert Bosch, GmbH the entire contents of which are incorporated herein by reference. However, in contrast to U.S. patent application Ser. No. 18/346,598, the hydraulic system 10 permits back flow in the first circuit 10A when the controller 34 detects the conditions for the energy recovery mode. In the illustrated construction, the controller 34 detects the conditions for the energy recovery mode by detecting that the pressure of the boom actuator 20 exceeds a pressure threshold. The pressure threshold is representative of a minimum pressure within the boom actuator 20 needed for providing energy recovery in the first circuit 10A.

The load holding function of the second and auxiliary circuits 10B, 10C relies on the pressure compensators 66B, 66C, respectively. U.S. Pat. No. 10,590,962 describes the use of a pressure compensator valve and a counterbalance valve for load holding. U.S. Pat. No. 5,579,642 describes the use of a post-compensated control valve for load holding. In other words, each of the second and auxiliary circuits 10B, 10C utilize conventional hydraulic load holding.

The load sensing function for the first circuit 10A is provided solely by the controller's 34 displacement control of the variable displacement pump 32 without any pressure-compensating of flow through the master spool valve 48A when the master spool valve 48A is in the extend position. In other words, the load sensing for the first circuit 10A is provided exclusively by the controller's 34 displacement control of the pump 32, without throttling flow in the first circuit 10A. The pump 32 is an over-center variable displacement pump, which provides more control modes, like the direct displacement control, than traditional hydraulic unit. For instance, the pump 32 may control the output flow rate independent of the load conditions, thus compensating the loss of one pressure compensator. The algorithm of the controller 34 adjusts the working modes based on the user command and loading conditions of the actuators. The hydraulic system 10 includes a swivel plate valve solenoid 80 that is configured to control a swivel plate of the pump 32 (FIG. 1). The solenoid 80 is coupled to the swivel plate to increase or decrease the displacement of the pump 32 by controlling the swivel plate. The solenoid 80 is coupled to the controller 34. The controller 34 is configured to provide displacement control of the pump 32 by direct current command to the solenoid 80 proportional to a first operator input. The system of displacement control is further described in U.S. Patent Publication No. 2023/0296171 ("the '171 Publication") filed Jul. 3, 2023, to Robert Bosch, GmbH the entire contents of which are incorporated herein by reference.

Figure 4:
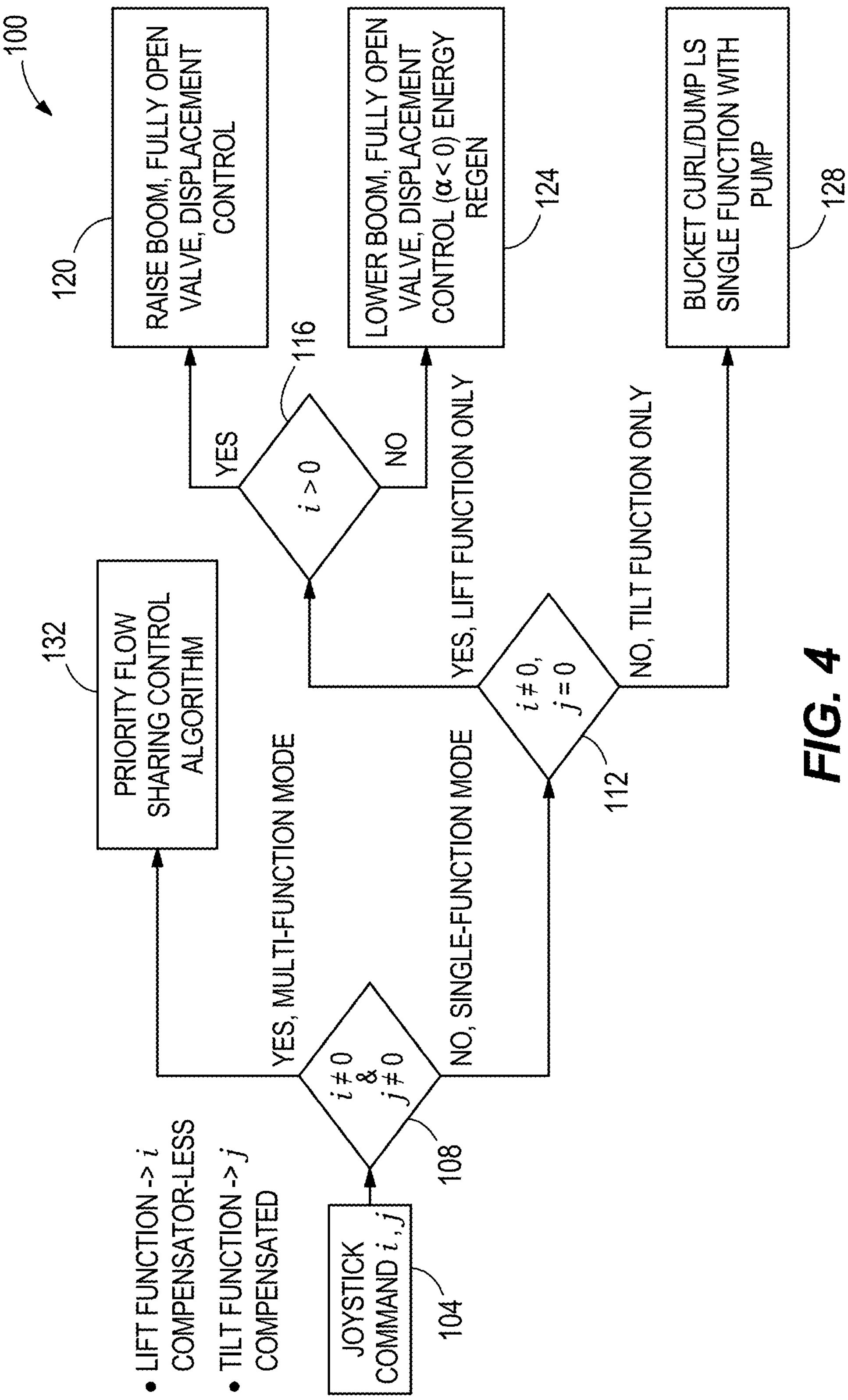
FIG. 4 illustrates a flowchart detailing a control algorithm for the hydraulic system.

FIG. 4 illustrates a control system 100 for managing the flow within the hydraulic system 10. Specifically, the control system 100 represents an algorithm programmed into and/or executable by the controller 34. The control system 100 begins at block 104 when a user input is received. In the illustrated construction, the user input is received via a joystick, which receives the lift function (i.e., "i") and/or the tilt function (i.e., "j"). In other constructions, the user input receives additional functions, such as a function for the auxiliary circuit 10C. The algorithm analyzes the user input at block 108 to determine whether the user input requested both the lift function (e.g., $i \neq 0$ and $j \neq 0$). In the instance that the algorithm determines that the user input is only for a single function (e.g., lift or tilt function), the algorithm detects the "single-function mode" and proceeds to block 112. At block 112, the algorithm determines whether the user input is requesting the lift function (i.e., $i \neq 0$ and $j=0$). In the instance that the algorithm determines that the user input is for the "lift function only," the algorithm proceeds to block 116. At block 116, the algorithm determines whether the user input for the lift function is for raising the boom actuator 20 (i.e., $i>0$). In the instance that the algorithm determines that the user input is for raising the boom actuator 20, the algorithm proceeds to block 120. At block 120, the algorithm sets a command to lift the boom actuator 20. Specifically, the displacement of the pump 32 is adjusted via the solenoid 80 to provide the exact required flow rate, the master spool valve 48A of the lift function keeps fully open to minimize the throttling losses, and there is no additional throttling with the pressure compensators 66B, 66C. Returning to block 116, in the instance that the algorithm determines that the user input is for lowering the boom actuator 20 ($i>0$=NO), the algorithm proceeds to block 124. At block 124, the algorithm sets a command to lower the boom actuator 20. Specifically, the displacement of the pump 32 is adjusted via the solenoid 80 such that the pump 32 functions as a motor as described above for energy recovery. At block 124, the displacement of pump 32, a, is less than zero (e.g., $\alpha<0$). When the displacement $\alpha$ of the pump 32 is less than zero (e.g., $\alpha<0$), the pump 32 functions as a motor. When the displacement $\alpha$ of pump is greater than zero (e.g., $\alpha>0$), the pump 32 functions as a pump. Returning to block 112, in the instance that the algorithm determines that the user input is for the "tilt function only," the algorithm proceeds to block 128. At block 128, the algorithm sets a command to curl or dump the bucket 18 depending on the user input.

Returning back to block 108, in the instance that the user input is for multiple functions (e.g., concurrent lift and tilt function), the algorithm detects the "multi-function mode" and proceeds to block 132. In other words, the pump 32 must provide pressure to both the non-pressure compensated circuit (e.g., the first circuit 10A) and to the pressure compensated circuit(s) (e.g., the second and auxiliary circuits 10B, 10C) to fulfil multiple functions.

Figure 5:
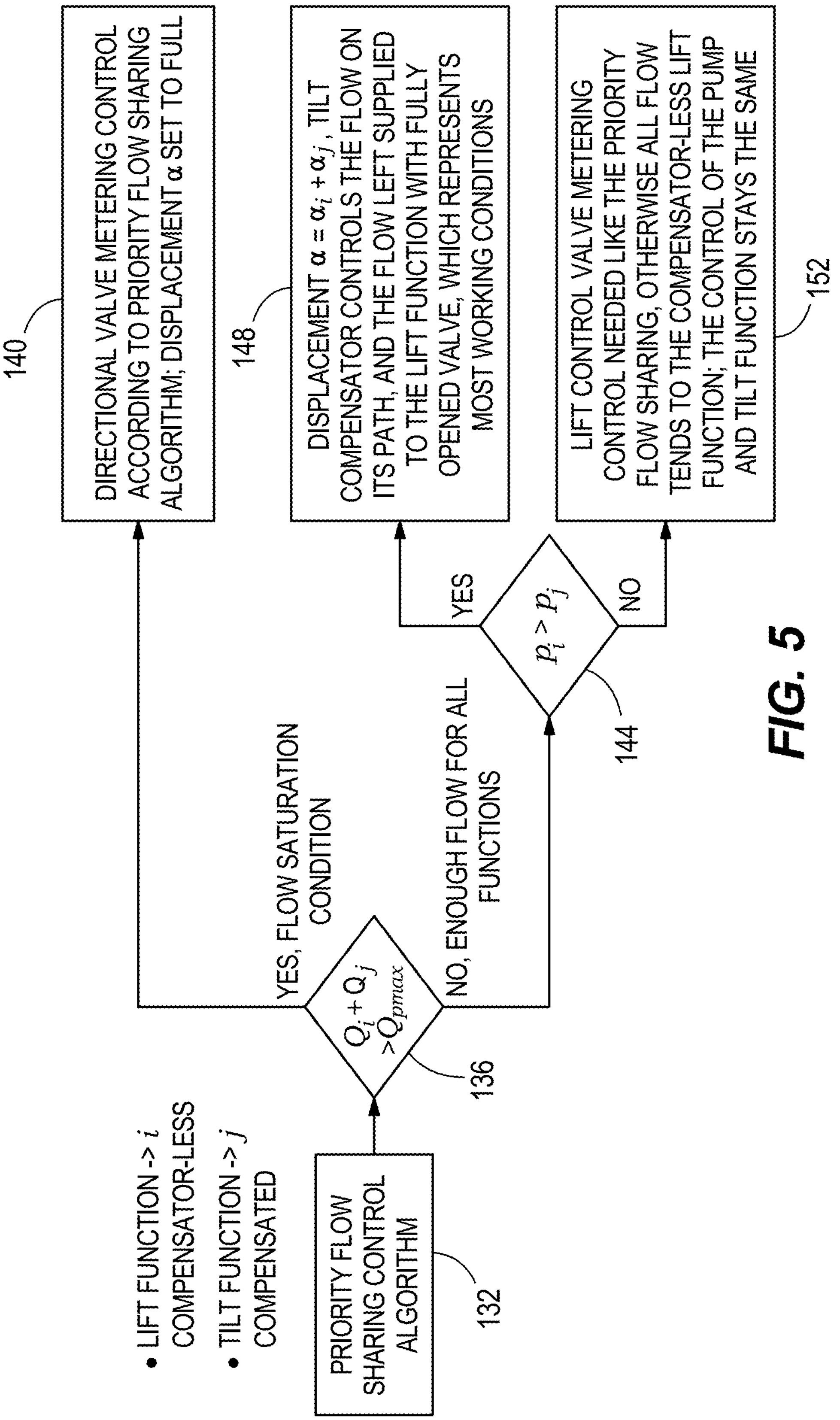
FIG. 5 illustrates a supplemental flowchart for the control algorithm of FIG. 4.

FIG. 5 illustrates additional details of the control system 100 in the multi-function mode. From block 132, the algorithm of the controller 34 proceeds to block 136 in which the algorithm determines whether the sum of the required flow of the lift function (i.e., $Q_i$) and the required flow of the tilt function (i.e., $Q_j$) exceeds the maximum flow capability of the pump 32 (i.e., $Q_{pmax}$).

In the instance that the sum of the required flow of the lift and tilt functions (i.e., $Q_i+Q_j$) exceeds the maximum flow provided by the pump 32, the algorithm determines that there is not enough flow for all functions and proceeds to block 140. In other words, the algorithm detects that the pump 32 is "saturated." At block 140, the algorithm employs priority flow sharing, which is activated when the pump 32 is saturated. At block 140, the pump displacement $\alpha$ is set to full such that a maximum output of the pump 32 is achieved. The displacement $\alpha$ is equivalent to the sum of the displacement of the lift function, $\alpha_i$, and the displacement of the tilt function, $\alpha_j$, (i.e., $\alpha=\alpha_i+\alpha_j$). The algorithm classifies all consumers (e.g., the boom actuator 20 and the secondary actuator 24) under three categories: Priority 0, Priority 1, and Priority 2. Priority 0 reflects the least important process and Priority 2 reflects the most important process. It is worth noting that more than one consumer can be classified with the same priority. For instance, the boom actuator 20 and the secondary actuator 24 may each be categorized as Priority 2. In the illustrated construction, the operator instructs the algorithm for the classification of the consumers.

In the instance that the algorithm detects saturation of the pump 32, the flow demand of consumers categorized as Priority 0 is/are reduced. If needed, the flow demand of the consumers categorized as Priority 0 is/are reduced to a minimum flow. In some constructions, each consumer classified as Priority 0 has a unique value for the minimum flow. In some constructions, the minimum flow is a fixed parameter. For instance, the minimum flow is considered the value at which the associated consumers maintain minimum performance. The operator instructs the algorithm for the minimum flow. In the hydraulic system 10, the flow reduction is achieved by metering control of the master spool valve 48A and the pressure compensators 66B, 66C.

In the instance that the algorithm detects saturation of the pump 32 after the flow demand to the consumers categorized as Priority 0 is set to a minimum flow, the flow demand of consumers categorized as Priority 1 is/are reduced. If needed, the flow demand of the consumers categorized as Priority 1 is/are reduced to a minimum flow. In the instance that consumers categorized as Priority 0, 1 have reached minimum flow and the pump 32 is still saturated, consumers categorized under Priority 0 and Priority 1 is/are reduced proportionally under their respective minimum flow values.

Flow demand for consumers categorized under Priority 2 are only reduced in the instance that the flow demand of consumers at Priority 0 and 1 are at zero. The flow sharing algorithm can be employed to the conventional load sensing system as well.

Returning to block 136, in the instance that the algorithm determines that the sum of the required flow of the lift and tilt functions (i.e., $Q_i+Q_i$) does not exceed the maximum flow provided by the pump 32, the algorithm proceeds to block 144. At block 144, the algorithm determines whether the load pressure of the compensator-less function (i.e., $P_i$) is greater than the load pressure of the compensator function (i.e., $P_j$). An example of the compensator function is the tilt function or auxiliary function. In the instance that the algorithm confirms that the load pressure of compensator-less function is greater than the load pressure of the compensated function (i.e., $P_i>P_j$), the algorithm proceeds to block 148. At block 148, the pressure compensator 66B of the second circuit 10B regulates the flow rate along its path. Consequently, the remaining flow from the pump 32 is directed to the lift function (e.g., the first circuit 10A) through a fully opened master spool valve 48A. In other words, the excess flow not supplied to the lower pressure function, which is regulated by the pressure compensator, is directed to the compensator-less function. In this scenario, the lift function operates under displacement control of the pump 32. This presents the most common working conditions and optimizes the performance considering the mechanism of the boom and bucket. In other words, the pressure necessary to operate the boom actuator 20 will likely be higher than the pressure necessary to operate the secondary actuator 24.

Returning to block 144, in the instance that the algorithm determines that the load pressure of the compensator-less function is less than the load pressure of the compensated function (i.e., $P_i<P_j$), the algorithm proceeds to block 152. At block 152, the algorithm employs metering control of the master spool valve 48A and the pressure compensators 66B, 66C such that flow is distributed between the non-pressure compensated circuit (e.g., the first circuit 10A) and the pressure compensated circuits (e.g., the second and auxiliary circuits 10B, 10C). Metering control of the master spool valve 48A is necessary when $P_i<P_j$ because all the flow would otherwise go to the non-pressure compensated circuit since it is the path of least resistance.

Although the invention has been described in detail with reference to certain preferred constructions, variations and modifications exist within the scope and spirit of one or more independent aspects of the invention as described.

What is claimed is:

1. A construction machine comprising:
- a first implement function operable by a first actuator;
- a second implement function operable by a second actuator; and
- a hydraulic system for controlling the first and second actuators in response to operator controls, the hydraulic system comprising:
  - a four-quadrant open-circuit pump;
  - a pressure line connected with the pump to be pressurized by the pump;
  - a tank line in communication with a fluid reservoir;
  - a first circuit including a first directional flow control valve in command of the first actuator to control the first implement function;

a second circuit in parallel with the first circuit, the second circuit including a second directional flow control valve in command of the second actuator to control the second implement function; and a load sense line, wherein the first circuit includes a disabled pressure compensator that is incapable of performing pressure compensation between the load sense line and the first directional flow control valve, and wherein the load sense line is connected to the second directional flow control valve with a pressure compensator.

2. The construction machine of claim 1, wherein the first actuator is a boom cylinder configured to control +/− lift of a boom of the construction machine.

3. The construction machine of claim 2, wherein the second actuator is a tilt cylinder configured to control +/− tilt of a bucket of the construction machine, the bucket depending from the boom.

4. The construction machine of claim 1, wherein the disabled pressure compensator includes a spool shimmed to maintain a wide-open position.

5. The construction machine of claim 1, wherein the hydraulic system includes an electric motor coupled to the pump and a battery coupled to the electric motor, wherein the electric motor and the pump are configured to transfer rotation therebetween, wherein the first circuit is configured for an energy recovery mode, wherein in the energy recovery mode, the pump drives rotation of the electric motor thereby generating an electrical charge, and the battery receives the electrical charge.

6. The construction machine of claim 1, wherein the first circuit is configured for an energy recovery mode, wherein the second actuator is actuated via pressure supplied from the first actuator in the energy recovery mode.

7. The construction machine of claim 1, further comprising a controller configured to detect a pump saturation condition, wherein the controller is configured to meter the first directional flow control valve in response to determining the pump saturation condition.

8. The construction machine of claim 1, further comprising a controller configured to detect a pump saturation condition, a pressure of the first circuit, and a pressure of the second circuit, wherein the controller is configured to meter the first directional flow control valve in response to determining the pressure of the second circuit is greater than the pressure of the first circuit and determining that there is no pump saturation condition.

9. The construction machine of claim 8, wherein controller is configured to maintain the first directional flow control valve in an open position in response to determining that the pressure of the second circuit is less than the pressure of the first circuit.

10. A construction machine comprising:

a first implement function operable by a first actuator;

a second implement function operable by a second actuator; and a hydraulic system for controlling the first and second actuators in response to operator controls, the hydraulic system comprising:

a four-quadrant open-circuit pump;

a solenoid configured to control a swivel plate of the pump; and a controller configured to provide displacement control of the pump by direct current command to the solenoid;

wherein the first and second actuators are both configured for actuation by the pump in parallel first and second circuits, and wherein load sensing for the first actuator is provided exclusively by the controller's displacement control of the pump, and wherein load sensing for the second actuator is provided by a pressure compensator to adjustably throttle flow in relation to a sensed load pressure.

11. The construction machine of claim 10, wherein load sensing for the first actuator is provided exclusively by the controller's displacement control of the pump, without throttling flow in the first circuit.

12. The construction machine of claim 11, wherein the first actuator is a boom cylinder configured to control +/− lift of a boom of the construction machine and wherein the second actuator is a tilt cylinder configured to control +/− tilt of a bucket of the construction machine, the bucket depending from the boom.

13. The construction machine of claim 11, wherein the hydraulic system includes a plurality of pressure sensors, wherein a pressure sensor of the plurality of pressure sensors detects a pressure of the first actuator, wherein a pressure sensor the plurality of pressure sensors detect a pressure of the pump.

14. The construction machine of claim 10, wherein the hydraulic system includes a prime mover coupled to the pump and an energy store coupled to the prime mover, wherein the first circuit is configured for an energy recovery mode, wherein the pump receives flow from the first circuit and the prime mover receives energy from the pump, wherein the energy store stores energy from the prime mover.

15. A method of controlling a construction machine, the method comprising:

driving a variable displacement pump with a prime mover to charge a pressure line of a hydraulic system having a first control valve with an extend position configured to selectively connect a first actuator for a first implement function to the pressure line and a second control valve with an extend position configured to selectively connect a second actuator for a second implement function to the pressure line;

setting the second control valve into the extend position, and providing load sensing with a pressure compensator to throttle flow through the second control valve while extending the second actuator;

setting the first control valve into the extend position, and providing load sensing solely by control of the variable displacement pump without any pressure-compensating throttling of flow through the first control valve, while extending the first actuator; and maintaining the first control valve in the extend position in which energy is recovered by the prime mover through the pump while retracting the first actuator.

16. The method of claim 15, wherein a controller controls the pump to provide displacement control in proportion to a first operator input when only the first actuator is in use.

17. The method of claim 16, wherein the controller controls the pump to provide displacement control in proportion to an operator input when the first and second actuators are concurrently in use.

18. The method of claim 17, wherein the controller controls flow to the first actuator and the second actuator by metering control of the first control valve and the pressure compensator.

19. The method of claim 15, wherein recovering energy by the prime mover through the pump while retracting the first actuator includes operating the prime mover as an electrical generator and directing charging current to a battery.

20. The method of claim 15, wherein the first implement function is +/− boom lift, and the second implement function is +/− bucket tilt.

* * * * *